(12) United States Patent
Izuhara et al.

(10) Patent No.: US 7,852,732 B2
(45) Date of Patent: Dec. 14, 2010

(54) LENS APPARATUS

(75) Inventors: Isamu Izuhara, Sennan (JP); Yasuyuki Tomita, Utsunomiya (JP); Shin-ichiro Yakita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/029,858

(22) Filed: Feb. 12, 2008

(65) Prior Publication Data
US 2008/0198729 A1 Aug. 21, 2008

(30) Foreign Application Priority Data
Feb. 20, 2007 (JP) ............................. 2007-039533

(51) Int. Cl.
*G02B 7/28* (2006.01)
*G03B 7/099* (2006.01)

(52) U.S. Cl. ..................... 369/111; 359/640; 359/833

(58) Field of Classification Search ............... 396/104, 396/111, 112, 384; 353/81; 359/625, 640, 359/833
See application file for complete search history.

(56) References Cited

U.S. PATENT DOCUMENTS

| | | | | |
|---|---|---|---|---|
| 4,757,372 A * | 7/1988 | Betensky et al. | ............ | 359/694 |
| 5,204,710 A * | 4/1993 | Tsukamoto et al. | ......... | 359/698 |
| 5,790,316 A | 8/1998 | Terasawa et al. | ............ | 359/687 |
| 6,002,528 A | 12/1999 | Tomita | ........................ | 359/684 |
| 6,282,032 B1 | 8/2001 | Tomita | ........................ | 359/687 |
| 6,512,637 B1 | 1/2003 | Tomita | ........................ | 359/686 |
| 7,236,305 B2 | 6/2007 | Yakita | ........................ | 359/675 |
| 2005/0094026 A1 | 5/2005 | Yakita et al. | ................ | 348/360 |
| 2006/0001759 A1 * | 1/2006 | Raschke | ..................... | 396/349 |
| 2006/0285842 A1 * | 12/2006 | Ide | ............................. | 396/93 |
| 2007/0058264 A1 | 3/2007 | Yakita | ........................ | 359/676 |

FOREIGN PATENT DOCUMENTS

| | | |
|---|---|---|
| EP | 1 253 588 A1 | 10/2002 |
| EP | 1 487 199 A1 | 12/2004 |
| EP | 1 762 875 A1 | 3/2007 |
| JP | 2003-270520 | 9/2003 |
| JP | 2004-85673 | 3/2004 |
| JP | 2004-118141 | 4/2004 |
| JP | 2005-181469 | 7/2005 |
| JP | 2009-134801 A | 6/2009 |
| WO | 03/067323 A1 | 8/2003 |

OTHER PUBLICATIONS

Aug. 2, 2010 European Search Report in European Patent Appln. No. 08151621.3.

* cited by examiner

*Primary Examiner*—Christopher E Mahoney
*Assistant Examiner*—Autumn Parker
(74) *Attorney, Agent, or Firm*—Fitzpatrick, Cella, Harper & Scinto

(57) ABSTRACT

A lens apparatus has a focusing lens unit, a separating optical unit disposed on an optical axis of the lens apparatus, a focus detection unit that detects focus condition using a light beam from the separating optical unit, a first drive unit that drives the focusing lens unit based on an output of the focus detection unit, and a second drive unit that drives the separating optical unit. An optical separating surface that the separating optical unit has reflectance that varies continuously in a first direction. The second drive unit drives or moves the separating optical unit in the first direction.

10 Claims, 15 Drawing Sheets

LENS APPARATUS

BACKGROUND OF THE INVENTION

1. Field of the Invention

The present invention relates to a lens apparatus for use in a still camera, video camera, television camera for broadcasting or the like that is provided with a separating optical unit disposed in an optical path and is adapted to perform automatic focusing (AF: Auto Focus) utilizing a separated light beam.

2. Description of the Related Art

Heretofore, various techniques of automatic focusing in shooting apparatuses such as still cameras and video cameras have been developed. In particular, Japanese Patent Application Laid-Open No. 2004-85673 and Japanese Patent Application Laid-Open No. 2005-181469 disclose lenses and image pickup apparatuses in which a separating optical unit is provided in an optical path and an AF detection unit is provided in the separated optical path.

These systems suffer from a problem of decrease in the light amount in the shooting optical system involved by providing a focus detection system separately from a shooting optical system. To solve this problem, Japanese Patent Application Laid-Open No. 2003-270520 and Japanese Patent Application Laid-Open No. 2004-118141 disclose an optical system in which the reflectance of a separating optical unit which introduces light into the focus detection system is changed by turning a turret to achieve a required amount of light in the image pickup system, and an optical system having a focus detection system that uses light in the infrared range.

In conventional focus determination methods that use a separating mirror, it is necessary to introduce a certain amount of light into a focus detection system, which leads to a decrease in the transmittance in the image pickup system, which in turn leads to an increase in the T-number. In particular, when the brightness of the object is low, there is a problem that an amount of light necessary in shooting cannot be obtained even when the aperture stop is fully opened.

Furthermore, when the turret is turned to change the reflectance of the separating mirror, there is a problem that the reflectance cannot be changed during shooting since the image is interrupted for a while.

In order to eliminate the above described problems, the present invention provides a lens apparatus that can operate with high precision at high speed while separating incident light beams in an imaging optical system to perform focus detection without a decrease in the amount of light in shooting.

SUMMARY OF THE INVENTION

In a lens apparatus according to the present invention, incident light beams are separated in an image pickup optical system for focus detection and that can perform focusing operation with high precision at high speed.

A lens apparatus according to the present invention comprises a focusing lens unit, a separating optical unit disposed on an optical axis of the lens apparatus, a focus detection unit that detects the focus condition using a light beam from the separating optical unit, a first drive unit that drives the focusing lens unit based on an output from the focus detection unit, and a second drive unit that drives the separating optical unit, wherein the reflectance of an optical separating surface that the separating optical unit has varies in a first direction, and the second drive unit drives or moves the separating optical unit in the aforementioned first direction.

Further features of the present invention will become apparent from the following description of exemplary embodiments with reference to the attached drawings.

DESCRIPTION OF THE EMBODIMENTS

Figure 1:
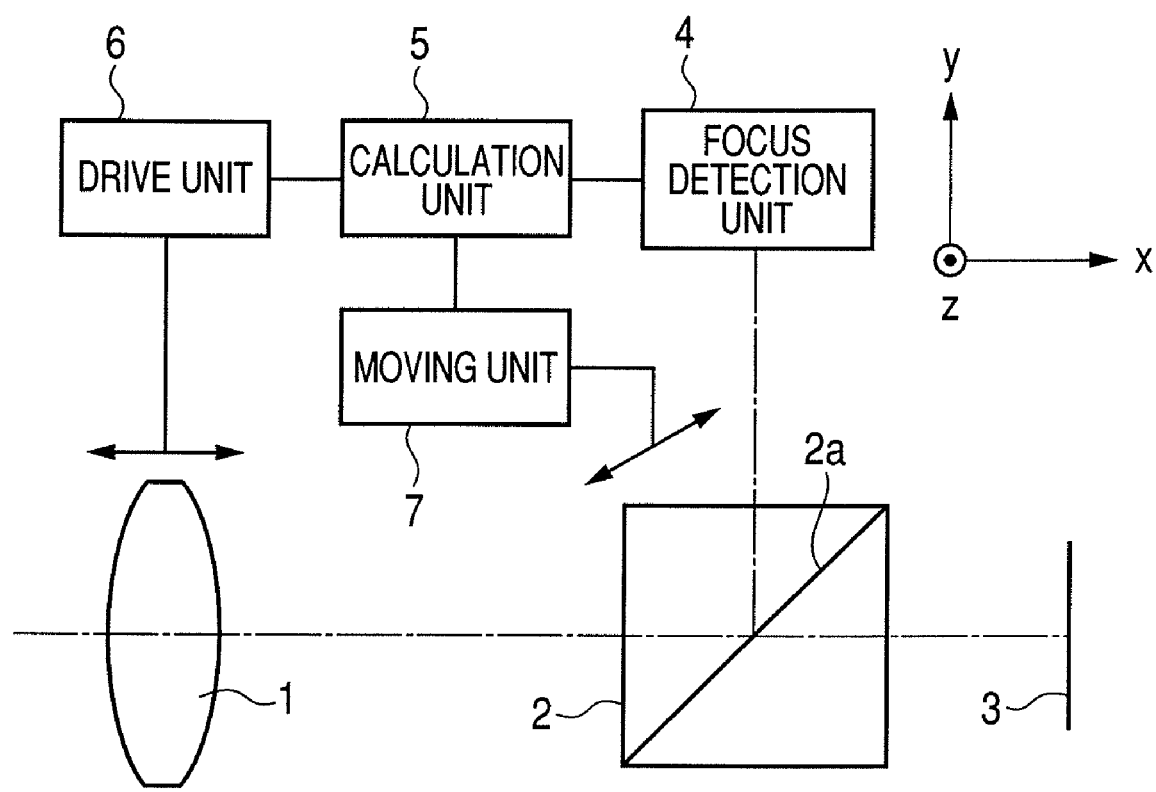
FIG. 1 schematically shows a lens apparatus according to a first embodiment.

In the following, the present invention will be described in detail with reference to embodiments illustrated in the drawings.

First Embodiment

FIG. 1 schematically shows a lens apparatus according to a first embodiment. The lens apparatus has a focusing lens unit 1, an image pickup element (or a photoelectric transducer) 3, a separating optical unit 2 disposed between the focusing lens unit 1 and the image pickup element 3, and other lens unit(s) (not shown) pertaining to zooming or other functions.

A portion of the light beams to be introduced to the image pickup element 3 through the focusing lens unit 1 is reflected by a reflection surface (or optical separating surface) 2a of the separating optical unit 2 and guided to a focus detection unit 4, whereby the focus condition of the object by the lens apparatus is detected. Based on an output from the focus detection unit 4, a calculation unit 5 transmits information related to a movement amount (such as a movement amount or a number of steps) to a drive unit (first drive unit) 6 for driving the focusing lens unit 1 and a moving unit (second drive unit) 7 for moving the separating optical unit 2.

In this way, a portion of the light beams to be used in image pickup is separated (or reflected) by the separating optical unit 2, and the focusing lens unit 1 and/or the separating optical unit 2 (with the reflection surface 2a provided therein) are moved based on information (i.e., information on the focus condition) obtained from that portion of the light beams.

Figure 2:
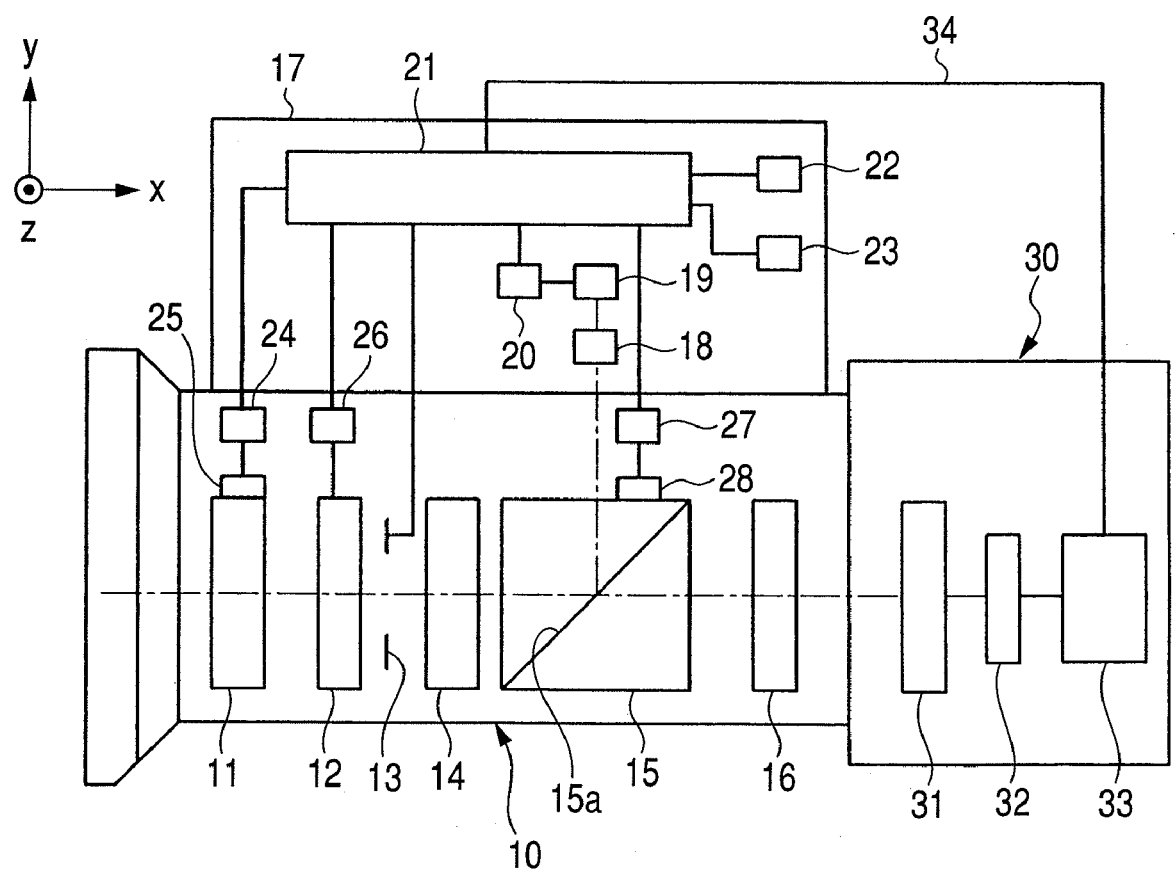
FIG. 2 is a circuit block diagram of the lens apparatus according to the first embodiment and an image pickup apparatus.

FIG. 2 is a specific circuit block diagram of the first embodiment. The lens apparatus 10 is interchangeably mounted on the image pickup apparatus (shooting apparatus) 30.

The lens apparatus 10 has a focusing lens unit 11, a zooming lens unit 12, an aperture stop 13, a front relay lens unit 14, a reflection element (or separating optical unit) 15 and a rear relay lens unit 16, which are arranged along the optical axis of the lens apparatus (i.e., along the x axis in the x, y, z orthogonal coordinate system shown in FIG. 2) in the mentioned order from the object side. The reflection surface 15a of the reflection element 15 is inclined relative to the optical axis by 45 degrees. (It will be understood that the inclination angle is not limited to 45 degrees, but the optical axis and the normal of the reflection surface 15 should not be parallel to each other.) The reflectance of the reflection surface 15a varies continuously in the direction perpendicular to the optical axis (i.e., in the z axis direction in FIG. 2). (Specifically the reflectance increases or decreases monotonously in the z axis direction.) The reflection element 15 is adapted to be movable in the direction in which the characteristic varies, that is, in the z axis direction.

The light beams reflected by the reflection surface 15a of the reflection element 15 are incident on a focus condition detection unit 17 that detects object light incident on the lens apparatus 10. In the focus condition detection unit 17 are arranged an AF lens 18 that receives reflection light from the reflection element 15 and a focus detection image pickup element 19 that receives light beams having passed through the AF lens 18. The output of the focus detection image pickup element 19 is stored in a memory unit 20, and the stored information (information on the focus condition) is processed by a lens CPU 21.

The lens CPU 21 is configured to determine drive amounts (or numbers of driving steps) of the focusing lens unit 11 and the reflection element 15 based on input signals from an AF activation switch 22 that determines whether or not automatic focusing is to be performed and a light quantity control switch 23 that determines whether or not automatic exposure is to be performed and an input signal from the aforementioned focus detection image pickup element 19 (or the memory unit 20). Specifically, the lens CPU 21 transmits information (i.e., information on the movement amount of the focusing lens unit or information on the number of driving steps of a motor) to a focusing lens unit drive circuit 24 that controls a drive motor (or the first drive unit) 25 for driving the focusing lens unit 11. Furthermore, the lens CPU 21 transmits information (i.e., information on the movement amount of the reflection element 15 or information on the number of driving steps of a motor) also to a reflection element drive circuit 27 that controls a drive motor (or the second drive unit) 28 for driving the reflection element 15. In addition, the lens CPU 21 also transmits/receives information to/from a zooming sensor 26 that detects the position (or information on the position) of zooming lens unit 12 and a control unit (not shown) that controls the aperture stop 13.

The image pickup apparatus 30 has an image pickup apparatus optical system 31 and an image-taking image pickup element 32 that receives object light disposed on an extension of the optical axis of the lens apparatus 10. The image pickup apparatus optical system 31 has a color temperature conversion filter, an ND filter and a color separation prism. The image-taking image pickup element 32 includes a photoelectric transducer such as a CCD sensor or a CMOS sensor. The output of the image-taking image pickup element 32 is connected to a camera CPU 33 that performs calculation processing. The camera CPU 33 is connected with the lens CPU 21 via a cable 34. The cable 34 serves as an information transmission member, such as a cable and a contact connector, that enables communication of information between the image pickup apparatus 30 (or the camera CPU 33) and the lens apparatus 10 (or the lens CPU 21).

The outline of the focusing operation in the shooting system having the above described lens apparatus and an image pickup apparatus (or a camera body) is as follows. First, light beams separated by the reflection element 15 in the lens apparatus 10 are guided to the focus detection image pickup element 19, so that the focus condition is detected. The focusing lens unit 11 is moved based on information on the focus condition obtained therein, information on the position of the focusing lens unit, information on the position of the zooming lens unit obtained from the zooming sensor 26 and information on the aperture stop 13, etc. These operations may be performed entirely in the lens apparatus 10, or they may be performed solely by the image pickup apparatus (camera body) 30 or by the image pickup apparatus 30 and the lens apparatus 10 in cooperation.

In the following, the reflection element 15 will be described in detail.

Figure 3:
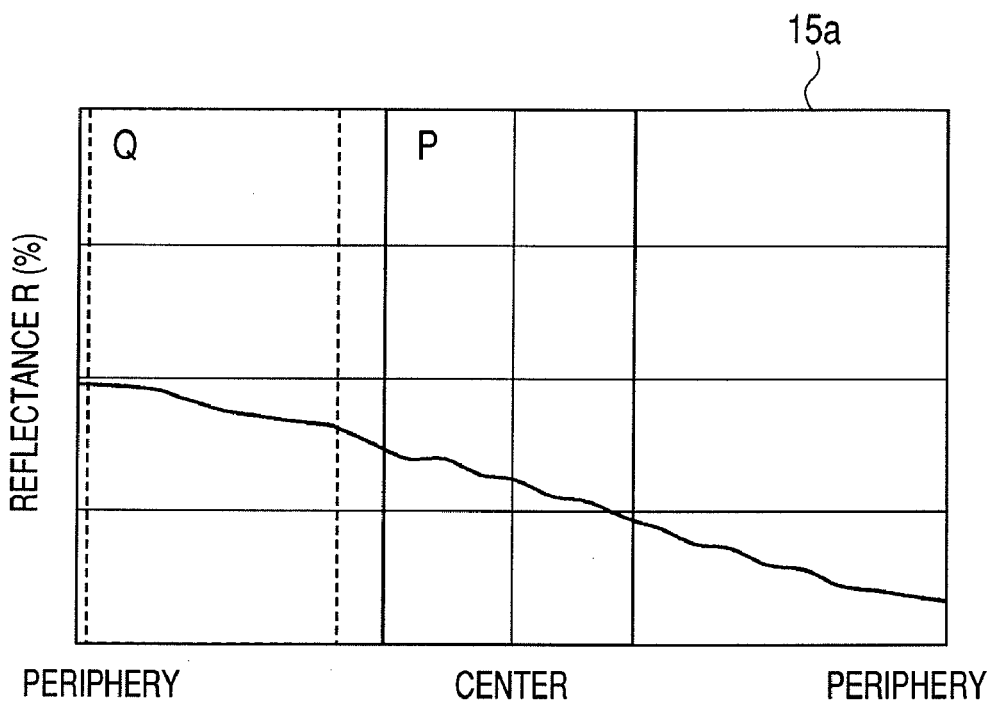
FIG. 3 shows the spectral reflectance distribution characteristic of a reflection element in the first embodiment.

FIG. 3 shows the spectral reflectance distribution characteristic (or the reflectance characteristic) of the reflection element 15. The reflection surface 15a of the reflection element 15 is configured to have reflectance that is designed to substantially monotonously decrease (or increase) from one end of the reflection surface 15a to the other end in the z axis direction in FIG. 2. Here, the z axis direction refers to the direction perpendicular to the plane defined by the optical axis of the lens apparatus (or the optical axis of image taking optical system including the focusing lens unit, the zooming lens unit, the front relay lens unit and the rear relay lens unit, etc.) and the optical axis of the AF lens unit on which the light beams reflected by the reflection element is incident (this plane corresponding to the plane of the drawing sheet of FIG. 2). The direction in which the reflection element 15 is moved (the first direction) is not limited to the z axis direction. The moving direction of the reflection element 15 may be any direction in which the reflectance of the reflection surface 15a varies.

Frames P and Q correspond to the beam width in the image pickup optical system, and a portion of the light beams in the image pickup apparatus associated with the reflectance in frame P (or frame Q) is reflected (or separated) by the reflection surface 15a so as to be introduced to the focus detection image pickup element 19. Thus, the amount of light introduced to the focus detection image pickup element 19 differs between a case in which the region of the reflection surface 15a inside frame P is inserted in the image pickup optical system and a case in which the region of the reflection surface 15a inside frame Q is inserted in the image pickup optical system.

Figure 4:
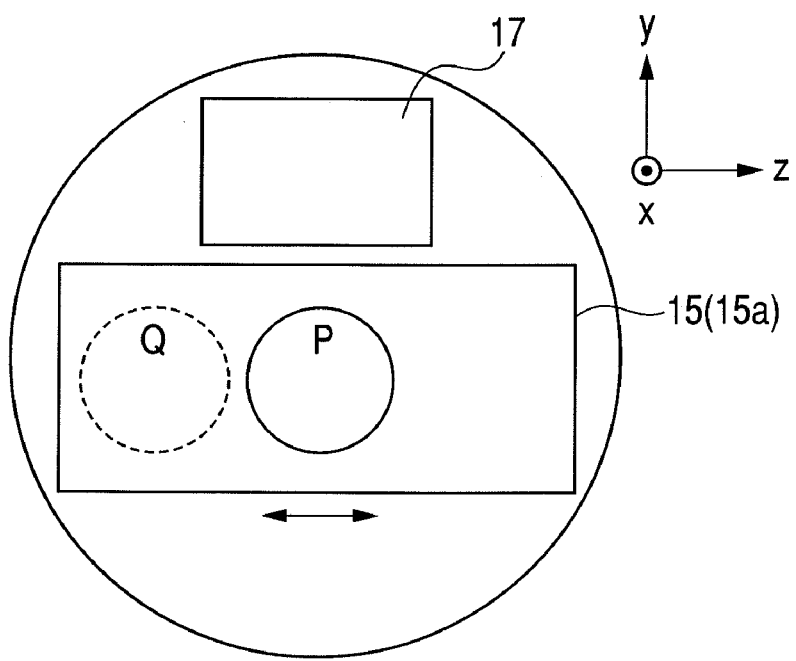
FIG. 4 is a lateral cross sectional view of the optical system in the first embodiment.

FIG. 4 is a cross sectional view of the optical system taken in the y-z plane in FIG. 2. By moving (or sliding) the reflection element 15 in the z axis direction as indicated by the double sided arrow in FIG. 4, a region of the reflection surface 15a having a desired reflectance can be selectively inserted in the image pickup optical system. This means that the amount of light introduced to the focus condition detection unit 17 can be adjusted by moving the reflection element 15 in the z axis direction.

In other words, by moving the reflection element 15 in the z axis direction (or moving the frame P, Q in FIG. 3), the reflectance of the reflection element can be increased (or decreased), whereby the amount of light incident on the focus condition detection unit 17 can be increased (or decreased). The moving operation can be performed during shooting, since the image is not interrupted during movement of the reflection element 15 because no light blocking member interrupts the light beams traveling in the image pickup optical system. Here, the light blocking member refers to a member like a frame of a turret that does not transmit light beams in the visible light range at all.

When automatic focusing operation is not performed, since it is not necessary to introduce light beams to the focus condition detection unit 17, the region of the reflection element 15 that has the smallest reflectance R (i.e., the rightmost end region in FIG. 3) is inserted in the image pickup optical system. This enables to introduce a larger amount of light to the image-taking image pickup element 32 in the image pickup apparatus 30.

Figure 5:
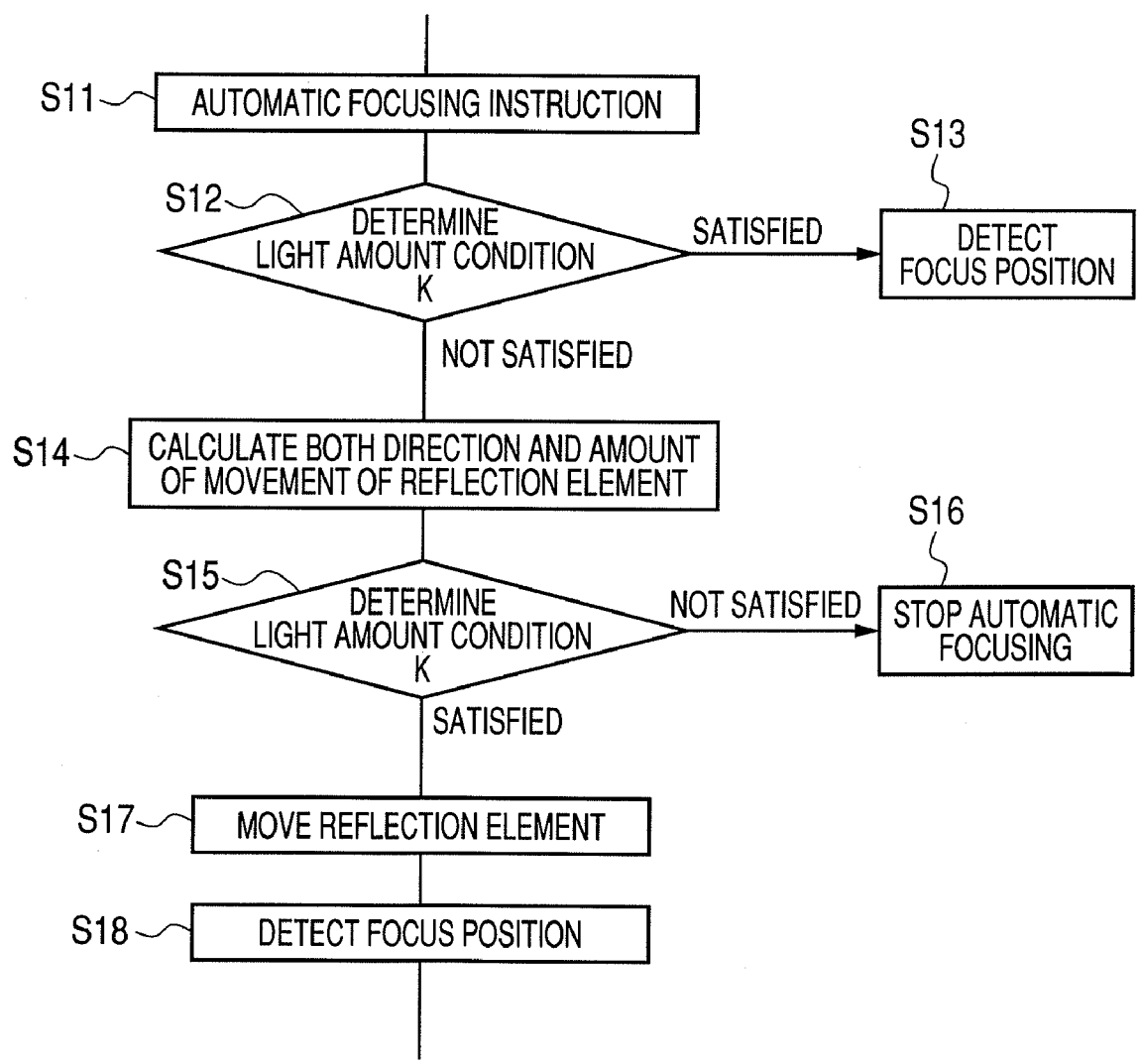
FIG. 5 is a flow chart of a process in the first embodiment.

FIG. 5 is a flow chart of a process of sliding the reflection element 15. When an automatic focusing instruction is entered by a user through the AF activation switch 22 (step S11), a determination is first made as to whether or not the amount of light introduced to the focus detection image pickup element 19 satisfies a light amount condition K (which will be described later) stored in advance in the memory unit 20 (step S12).

If the light amount condition K is satisfied, the focus position detection operation is executed (step S13). Specifically, the focus position is detected, then the direction and amount of movement according to which the focusing lens unit is to be moved are calculated (or alternatively information related to them is obtained), and then the focusing lens unit is moved according to the direction and amount of movement thus calculated. If the light amount condition K is not satisfied, the direction and amount of movement of the reflection element 15 required to satisfy the light amount condition K are calculated (step S14). Then, a determination is made as to whether or not the light amount condition K will be satisfied if the reflection element 15 is moved according to the calculation (step S15). (It should be noted that the reflection element 15 has not been moved actually yet in steps S14 and S15.) If it is determined in step S15 that the light amount condition K will not be satisfied (namely, in the case where a light amount large enough to enable automatic focusing will not be available even if the leftmost region having a high reflectance is used), the automatic focusing operation is stopped (step S16). In connection with the above, steps 14 and 15 may be brought together into a single step by incorporating step S14 into step S15.

If it is determined in step S15 that the light amount condition K will be satisfied, the reflection element 15 is moved according to the amount and direction of movement of the reflection element 15 calculated in step S14 (step S17). Then, the automatic focusing operation (or detection of the focus position) is executed (step S18).

In the case where the automatic focusing instruction has not been entered or the automatic focusing has been stopped, the reflection element 15 is moved to a position at which the region of the reflection surface 15a having the lowest reflectance is inserted in the image pickup optical system. (If the reflection element 15 is at that position from the beginning, it will not be moved.)

The light amount condition K is a condition that enables detection of the focus position using the focus detection image pickup element 19 in a short time without causing adverse effects on shooting. In cases where the amount of light incident on the focus detection image pickup element 19 is so small that the light amount condition K is not satisfied, a problem that a signal necessary to detect the focus position cannot be obtained or that it takes a significant time to obtain a satisfactory signal (or to accumulate a sufficient amount of light), whereby the speed of the focus position detection is lowered, will arise.

There also may be cases where the amount of light incident on the focus detection image pickup element 19 is so large that the light amount condition K is not satisfied. In such cases the following problem will arise that a signal necessary to seek the focus position cannot be obtained or that an amount of light, of light incident on the lens apparatus 10, larger than needed is introduced to the focus detection image pickup element 19 and the amount of light introduced to the image-taking image pickup element 32 is so small that the shot image becomes dark.

The light amount condition K may be specified by a constant value or a range defined by signs of inequality. In the case where the light amount condition K is specified by a constant value, a light quantity necessary in the focus position detection can be introduced to the focus detection image pickup element 19 stably, and reliable accuracy and stable speed in focusing can be ensured accordingly. On the other hand, if the object light quantity changes in a short time, the reflection element 15 is moved frequently, which results in frequent changes in the amount of light incident on the image-taking image pickup element 32, which makes the picked-up image unsightly.

In the case where the light amount condition K is specified by a range defined by signs of inequalities, even if the object light quantity changes in a short time, the amount and frequency of movement of the reflection element 15 are decreased, and influences on the picked-up image can be reduced. On the other hand, accuracy and speed of focusing may change depending on the object light quantity since the amount of light introduced to the focus detection image pickup element 19 by the reflection element 15 may change. In the case where the light amount condition K is specified by signs of inequality, it is generally desirable that the reflection element 15 be not moved in response to a change in the light amount within the range of ±5%/sec from the original light amount of the picked-up image.

In the following, the calculation of the direction and amount of movement of the reflection element 15 performed in step S14 will be described. The amount of light incident on the focus detection image pickup element 19 is proportional to the amount of light incident on the image pickup optical system and the reflectance of the reflection surface 15a. Assuming that the amount of light incident on the image pickup optical system does not change (in a short time), the amount of light incident on the focus detection image pickup element 19 is proportional to the area of the region in FIG. 3 in which the portion within the frame P (or frame Q) and the portion below the curve representing the reflectance overlap. In other words, the amount of light incident on the focus detection image pickup element 19 is proportional to the average reflectance of the portion of the reflection surface 15a that is inserted in the image pickup optical system. For example, if the light amount twice as much as the light amount currently incident on the focus detection image pickup element 19 is needed (to satisfy the light amount condition K), the reflection surface 15a (or reflection element 15) should be moved in such a way that the average reflectance of the portion of the reflection surface 15a that is inserted in the image pickup optical system becomes twice as high as the current value. Thus, a multiplier for increasing the current light amount to the light amount required to satisfy the light amount condition K may be determined, and the direction and amount of movement of the reflection surface 15a (or the reflection element 15) may be calculated based on the result of the determination and the reflectance characteristic of the reflection surface 15a that has been stored in advance. It will be understood that the position of the reflection element may be calculated based on an output(s) from the image pickup element 33 or other light amount sensor (photoelectric transducer) etc. and the state of the aperture stop 13 (or may be determined using a table or the like in which the position of the reflection element is stored), and the reflection element 15 may be moved according to the result of the calculation.

Although in this embodiment the reflection element 15 is adapted to introduce light beams from the object to the focus condition detection unit 18 by reflecting the light beams, the reflection element 15 may be adapted to introduce light beams to the focus condition detection unit 18 by transmitting the light beams from the object. In the latter case, the light beams reflected by the aforementioned reflection element 15 may be introduced to the image pickup element 32. In this first embodiment, it is assumed that light is not absorbed significantly by the reflection surface 15a (with the absorptance thereof being equal to or lower than 5% in the visible light range, preferably equal to or lower than 2%). From this follows that in the present invention, the fact that the reflectance of the reflection surface 15a of the reflection element 15 varies (monotonously) in the z axis direction (or the direction in which the reflection element 15 is moved) substantially the same meaning as the fact that the transmittance of the reflection surface 15a of the reflection element 15 varies (monotonously) in the z axis direction.

In this embodiment, when the automatic focusing operation is not performed, the position of the reflection element 15 is controlled so that the region of the reflection surface 15a that has the lowest reflectance is inserted in the image pickup optical system, but this is not essential. For example, in cases where the object brightness is too high even in the state of the aperture stop 13 stopped down, the reflection element 15 may be moved in order to reduce the amount of light coming from the object to the image pickup element 33. In other words, the reflection surface 15a of the reflection element 15 may be used as a light amount regulation filter (i.e., a filter having a transmittance that varies depending on the position thereon). In this case, the lens CPU 21 may be configured to drive the reflection element 15 based on the result of detection of the state of the aperture stop 13, image information picked up by the image pickup element 32 (or the camera CPU 33 that processing the information) and the like.

Second Embodiment

Figure 6:
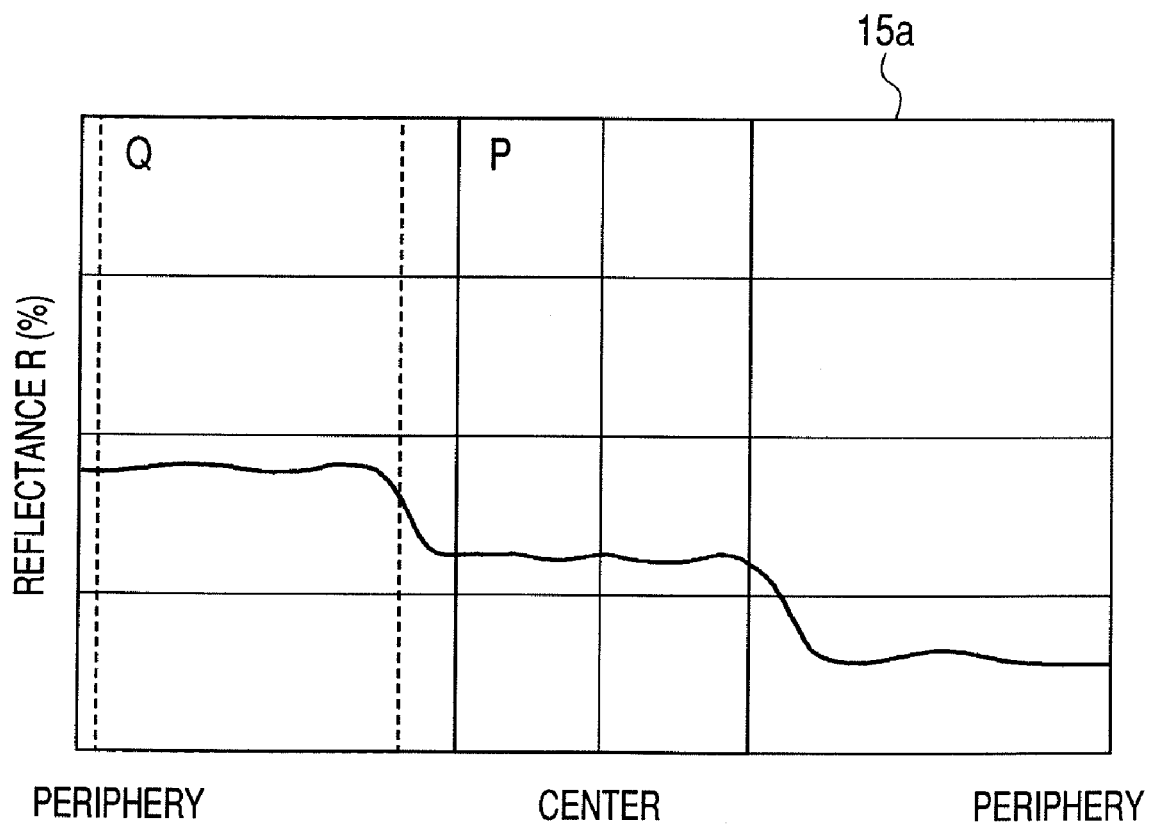
FIG. 6 shows the spectral reflectance distribution characteristic of a reflection element in a second embodiment.
Figure 7:
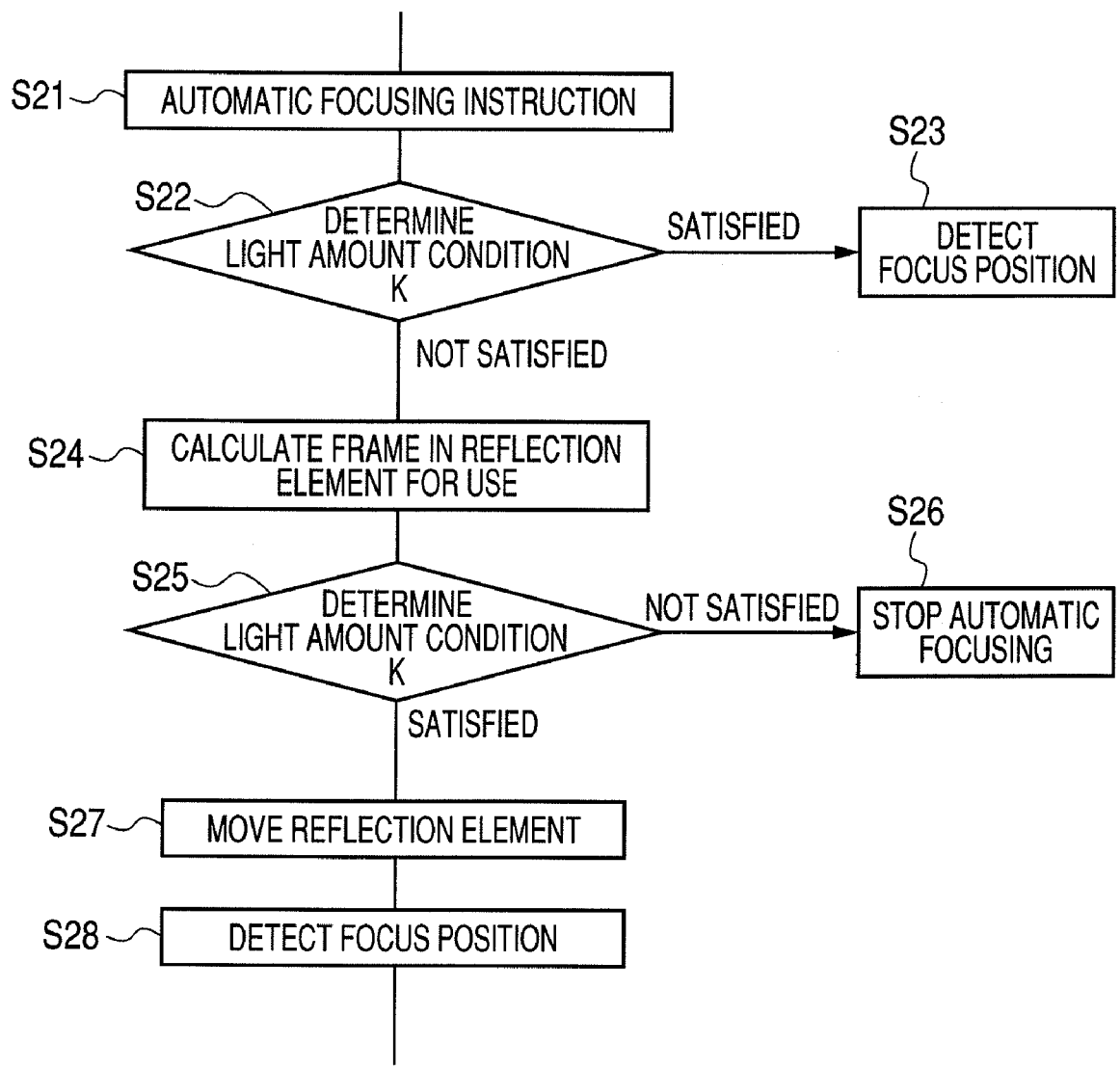
FIG. 7 is a flow chart of a process in the second embodiment.

FIG. 6 shows the spectral reflectance distribution characteristic (or the reflectance characteristic) of the reflection surface 15a of the reflection element 15 used in a second embodiment. FIG. 7 is a flow chart of an automatic focusing process in the second embodiment. The second embodiment differs from the first embodiment in the reflectance characteristic of the reflection surface 15a of the reflection element 15, and the flow chart of the automatic focusing process in the second embodiment differs from that of the first embodiment according to the difference in the reflectance characteristic. In the other respects, the second embodiment is the same as the first embodiment.

As shown in FIG. 6, the reflectance of the reflection surface 15a is designed to be substantially constant in each of frame P and frame Q (or can be made constant, or variations of the reflectance of the portion of the reflection surface 15a inserted in the image pickup optical system being kept within 3%). While fine adjustment of light amount cannot be performed as compared to the first embodiment in which the reflectance of the reflection surface 15a varies continuously depending on the position with respect to the z axis direction (or moving direction), the degree of shading or decrease in the light amount in one direction in the picked-up image can be reduced.

FIG. 7 is a flow chart of a process of moving the reflection element 15. When an automatic focusing instruction is entered by a user through the AF activation switch 22 (step S21), a determination is first made as to whether or not the amount of light introduced to the focus detection image pickup element 19 satisfies a light amount condition K stored in advance in the memory unit 20 (step S22). If the light amount condition K is satisfied, the focus position detection is executed (step S23).

If the light amount condition K is not satisfied, the lens CPU 21 calculates the frame position to be used in the reflection element 15 to satisfy the condition K (step S24), and a determination is made as to whether or not the light amount condition K will be satisfied if the reflection element 15 is moved (step S25). If it is determined that the light amount condition K will not be satisfied, the automatic focusing operation is stopped (step S26). If it is determined in step S25 that the light amount condition K will be satisfied, the reflection element 15 is moved according to the result of the calculation in step S24 (step S27). Then, detection of the focus position is executed (step S28). The descriptions of the light amount condition K and the method of calculating the frame to be used in the first embodiment also apply to the second embodiment.

Third Embodiment

In a third embodiment, the a determination as to whether the automatic focusing operation is to be performed or not is made by the lens CPU 21 based on information on the amount of light incident on the image-taking image pickup element 32 supplied from the camera CPU 33 in the image pickup apparatus 30 to the lens CPU 30 via a cable 34.

Figure 8:
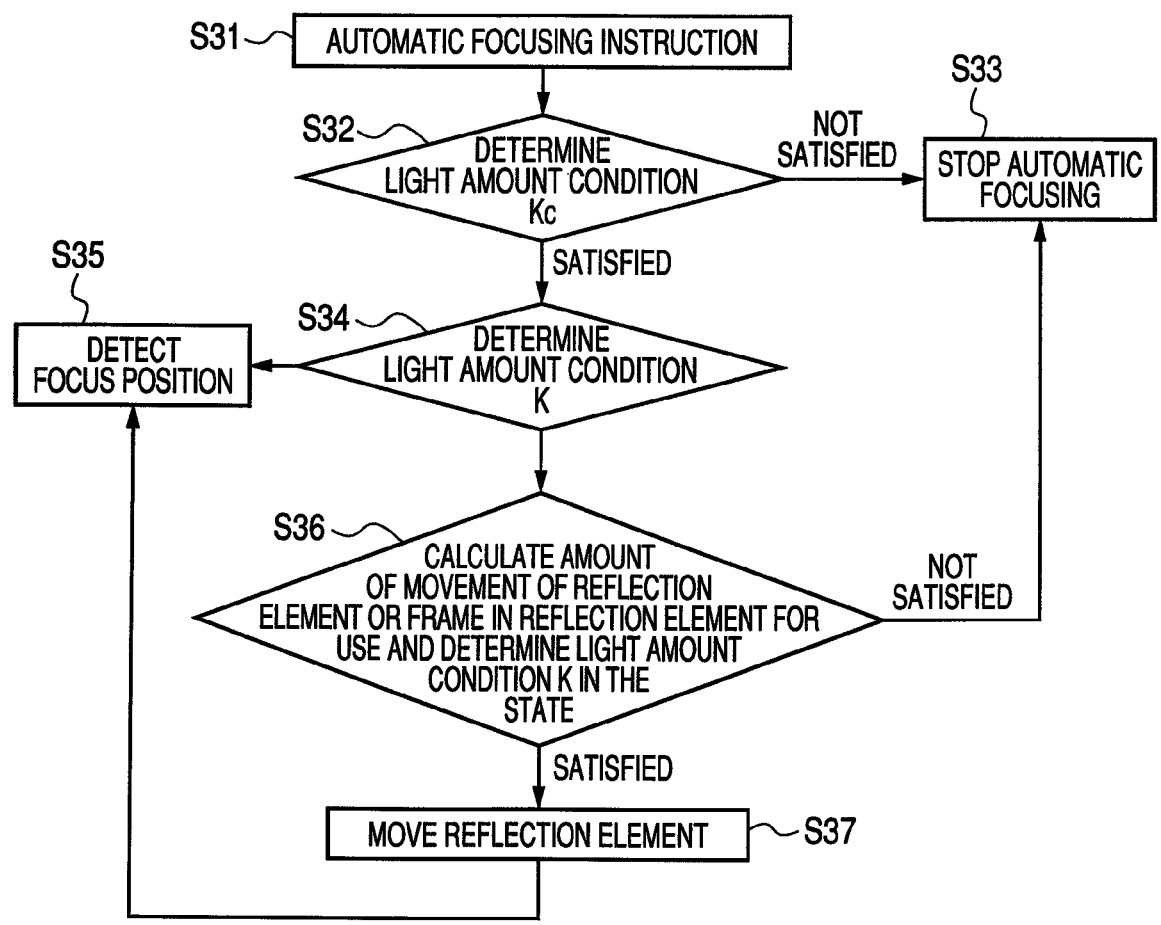
FIG. 8 is a flow chart of a process in a third embodiment

FIG. 8 is a flow chart of a process of moving the reflection element 15 according to the third embodiment. When an automatic focusing instruction is entered by a user through the AF activation switch 22 (step S31), information on the amount of light incident on the image-taking image pickup element 32 is first obtained in the image pickup apparatus 30. Then a determination is made as to whether or not the amount of light incident on the image-taking image pickup element 32 satisfies a light amount condition Kc stored in advance in the memory unit 20 (step S32). If the light amount condition Kc is not satisfied, the automatic focusing operation is stopped (step S33). If the light amount condition Kc is satisfied, a determination is made as to whether or not a light amount condition K stored in advance in the memory unit 20 is satisfied (step S34).

If the light amount condition K is satisfied, the focus position detection is executed (step S35). If the light amount condition K is not satisfied, the direction and amount of movement of the reflection element 15 with which the light amount condition K is satisfied or the frame position with which the light amount condition K is satisfied is calculated by the lens CPU 21 (step S36). Which is calculated, the direction and amount of movement or the frame position, depends on the reflectance characteristic, as described in the first and second embodiments. Subsequently, the reflection element 15 is moved according to the result of calculation in step S36 (step S37), and then the focus position detection is executed (step S35). The descriptions of the light amount condition K and the method of calculating the frame to be used in the first embodiment also apply to the third embodiment.

The light amount condition Kc is a condition that enables seeking of the focus position using the focus detection image pickup element 19 without significantly affecting the image picked up by the image pickup apparatus 30. When the amount of light incident on the image-taking image pickup element 32 is so small that the light amount condition Kc is not satisfied, the amount of light introduced to the focus detection image pickup element 19 by the reflection element 15 is small, which will disadvantageously make the automatic focusing impossible or slow the automatic focusing operation. In this case, even if the amount of light that is required for the automatic focusing operation can be introduced to the focus detection image pickup element 19 by the reflection element 15, the amount of light introduced to the image-taking image pickup element 32 in the image pickup apparatus 30 will become unduly small.

According to the third embodiment, by making a determination as to the amount of light incident on the image-taking image pickup element 32 based on the light amount condition Kc, influences on the picked-up image upon automatic focusing can be reduced.

In the first to third embodiments, it is desirable that the light amount condition K for the amount of light introduced to the focus detection image pickup element 32 can be set by the user at his/her discretion, or that light amount conditions K for various presumed shooting conditions be stored in advance in the memory unit 20 as described below so that the user can select one of them at his/her discretion.

For example, upon performing automatic focusing on an object that is moving at high speed, it is necessary to quickly detect the focus position for the moving object. In this case, to increase the focus position detection speed, the threshold value of the light amount condition K may be made larger to thereby increase the amount of light introduced to the focus detection image pickup element 19. On the other hand, in situations where the automatic focusing speed may be relatively low but it is desired to reduce influences of decreases in the amount of light incident on the image-taking image pickup element 32 in the image pickup apparatus 30 caused by the reflection element 15, the threshold value of the light amount condition K may be made smaller to thereby increase the amount of light introduced to the image-taking image pickup element 32.

In the first to third embodiments, it is preferred that when the automatic focusing operation is stopped, indication to that effect be made on a display unit that is not shown in the drawings preferably in step S16 in the first embodiment, step S26 in the second embodiment, and step S33 in the third embodiment.

Fourth Embodiment

Figure 9:
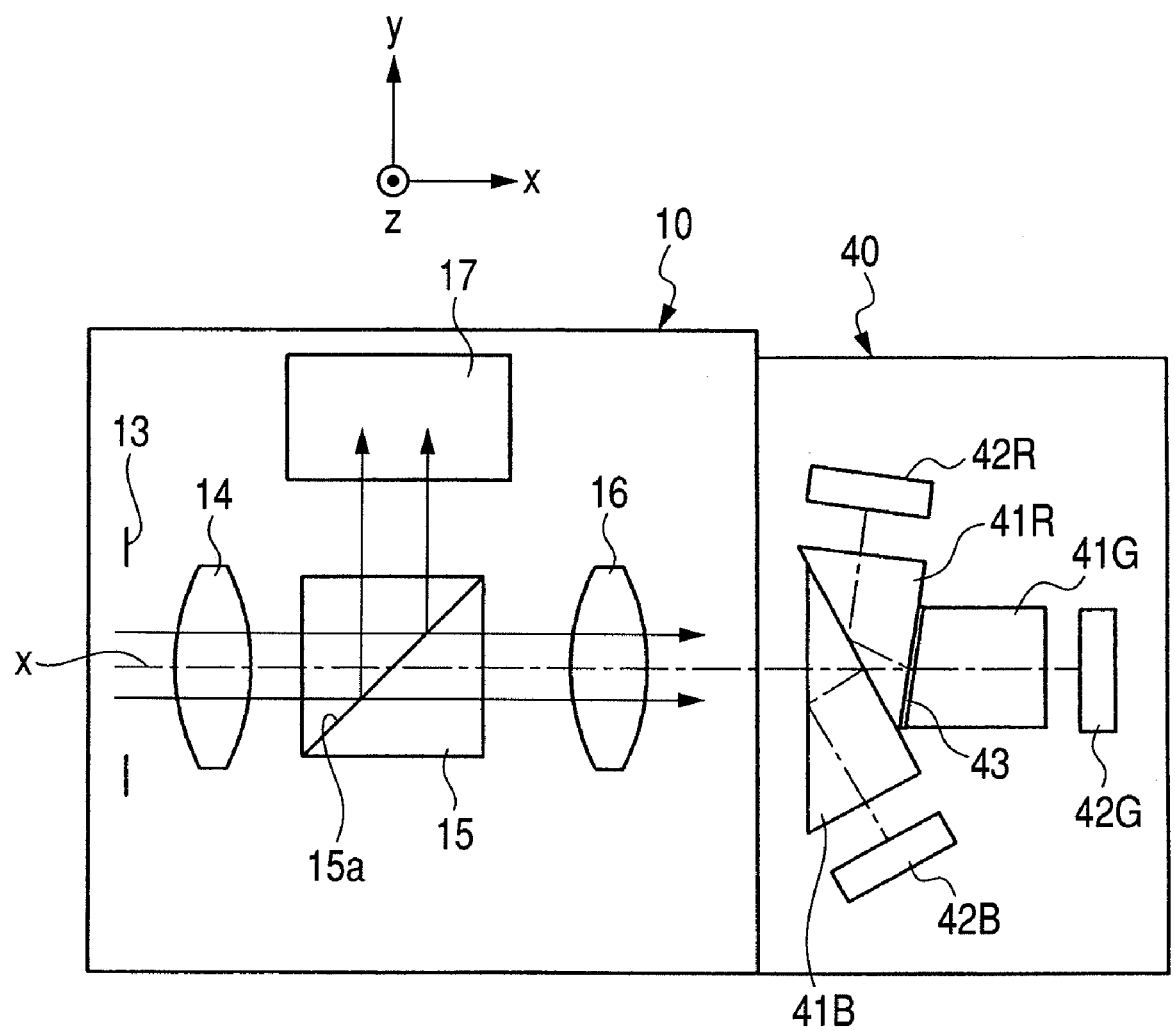
FIG. 9 is a circuit block diagram of a lens apparatus and an image pickup apparatus that are integrally coupled to each other according to a fourth embodiment.

FIG. 9 is a circuit block diagram of a fourth embodiment, which has a lens apparatus 10 and an image pickup apparatus 40 integrally connected therewith.

The image pickup apparatus 40 has color separation optical systems 41R, 41G, and 41B that separate the object light into R (red), G (green), and B (blue) channels, and image-taking image pickup elements 42R, 42G, and 42B that output image signals of a predetermined form. In addition, a red reflection dichroic film 43 is provided on the front surface of the color separating optical system 41G. The image pickup apparatus 40 also has a storage apparatus (not shown) for storing electrical signals obtained by the image-taking image pickup elements 42R, 42G, and 42B and a CPU that performs calculation processing etc.

The object light having entered the lens apparatus 10 is separated by a reflection element 15 toward a focus condition detection unit 17 in a similar manner as in the lens apparatus shown in FIG. 2. The reflection surface 15a of the reflection element 15 has functions, that is, the function of blocking the infrared (serving as an infrared cut filter) and the function of determining the long-wavelength side of the red light (serving as a red trim dichroic film). Alternatively, one of the functions of the infrared cut filter and the red trim dichroic film may be given to the reflection surface 15a and the other function may be given to another optical element other than the reflection element which may be disposed in the optical path of the light to be shot.

Figure 10:
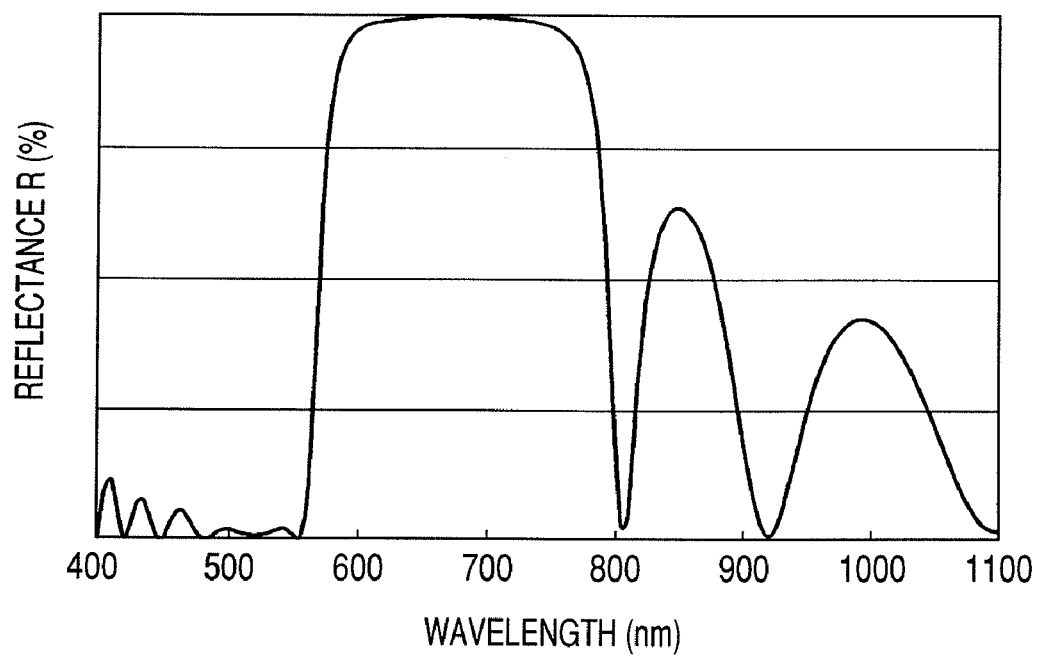
FIG. 10 shows the spectral reflectance characteristic of a red reflection dichroic film in the fourth embodiment.

FIG. 10 shows the spectral reflectance characteristic of the red reflection dichroic film 43 provided on the front surface of the prism 41R which constitutes the color separation optical system (or the surface between the prism 41G and the prism 41R). The spectral characteristic in the shorter wavelength range of the R channel (the wavelength of the short-wavelength side of the R channel and the wavelength of the short-wavelength side in the wavelength range guided to the image pickup element for the R channel) is determined by the spectral reflectance characteristic of the red reflection dichroic film 43. On the other hand, the spectral characteristic in the longer wavelength range of the R channel is determined by the spectral characteristic of the reflection surface 15a of the reflection element 15.

Figure 11:
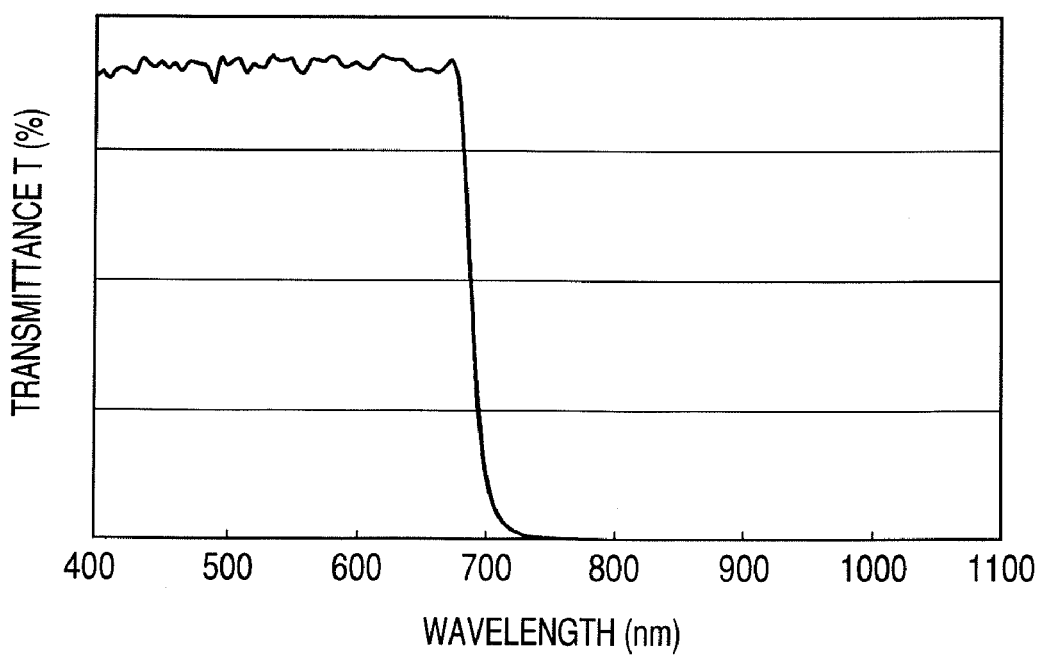
FIG. 11 shows the spectral transmittance characteristic of an infrared cut filter and a red trim dichroic film in the fourth embodiment.
Figure 12:
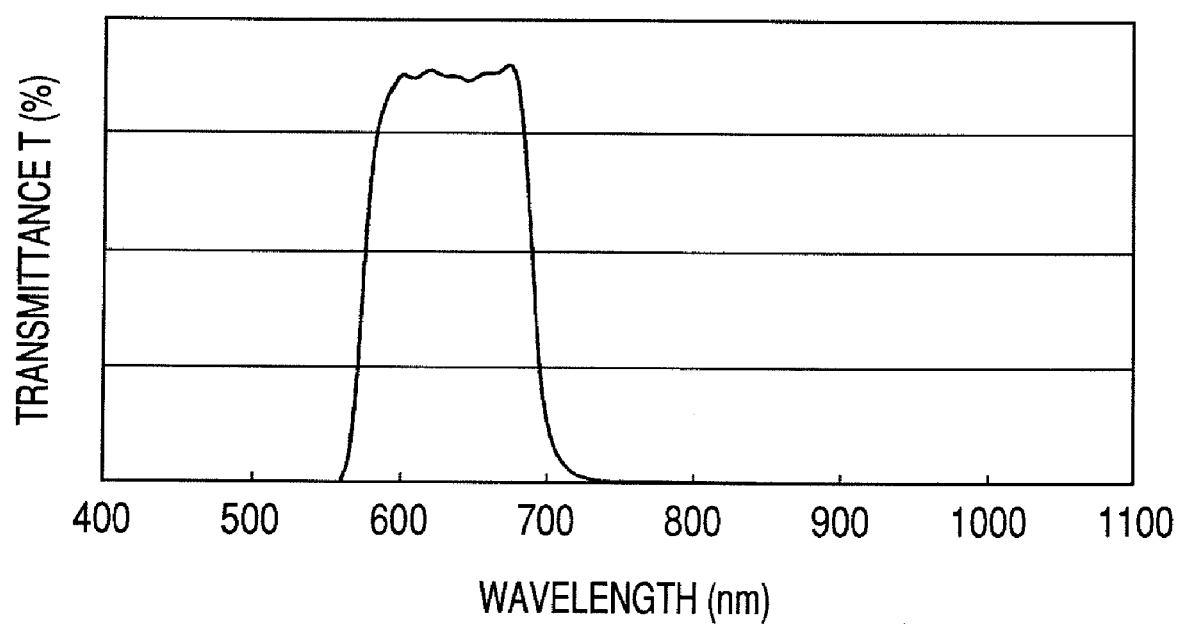
FIG. 12 shows the total transmittance characteristic in the R channel in the fourth embodiment.

FIG. 11 shows the spectral characteristic of the reflection surface 15a. FIG. 12 shows the total transmittance for the R channel (that is, the spectral characteristic of the combination of the spectral characteristic of the reflection surface 15a and the spectral characteristic of the red reflection dichroic film 43, or the spectral characteristic of the entire optical elements disposed in the optical path of light guided to the image pickup element 42R for the R channel). In the fourth embodiment, the light in the wavelength range shown in FIG. 12 (the wavelength range in which the transmittance is high in FIG. 12) can be guided to the image pickup element 42R for the R channel, so that it is understood that the image pickup apparatus has a better spectral characteristic. As per the above, an amount of light that used to be lost in the color separation optical system of conventional image pickup apparatuses can be guided to the focus condition detection unit 17, and the amount of light incident on the focus condition detection unit 17 can be increased, whereby the accuracy in focusing can be enhanced.

Fifth Embodiment

Figure 13:
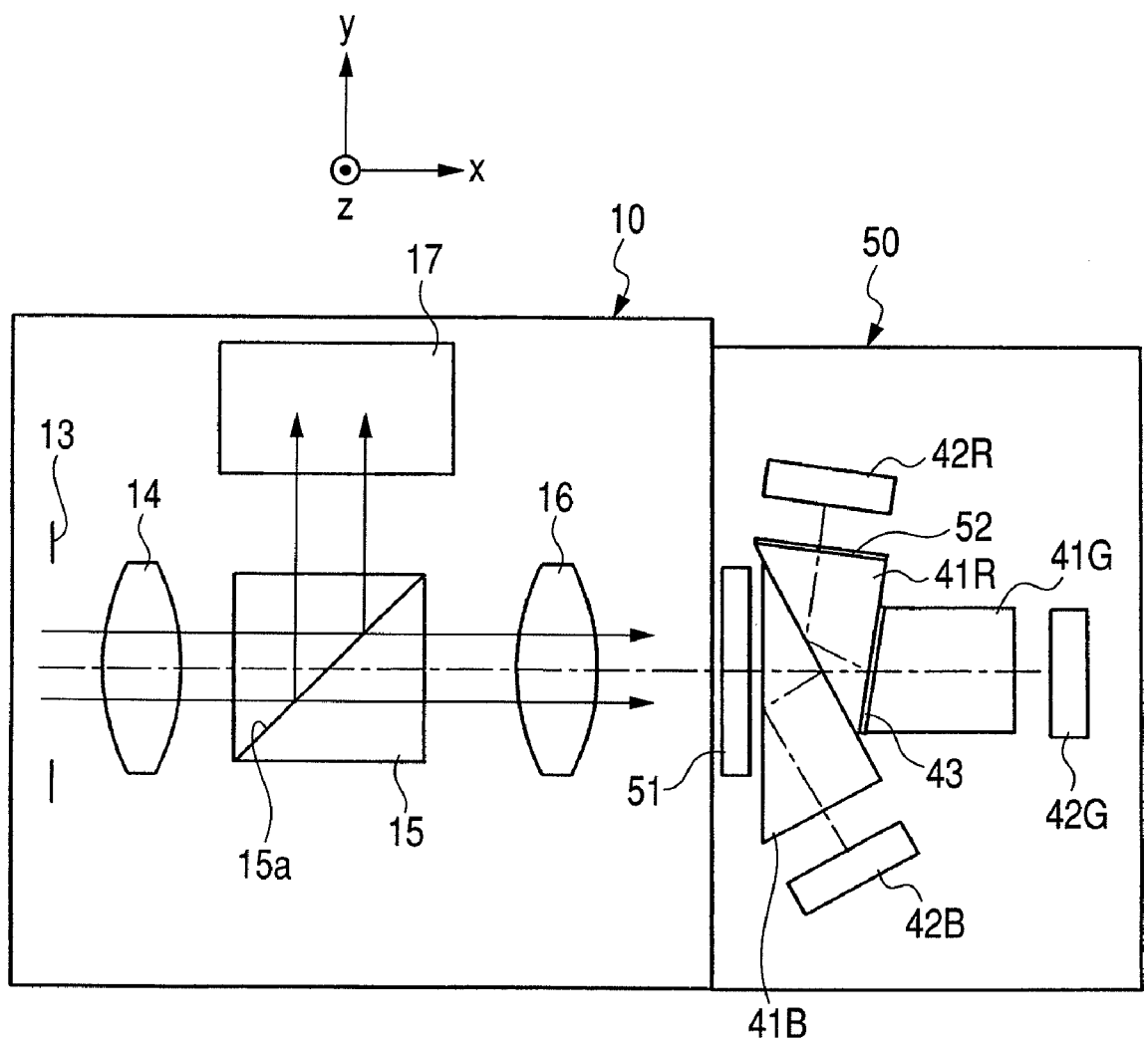
FIG. 13 is a circuit block diagram of an interchangeable lens apparatus according to a fifth embodiment and an image pickup apparatus.
Figure 16:
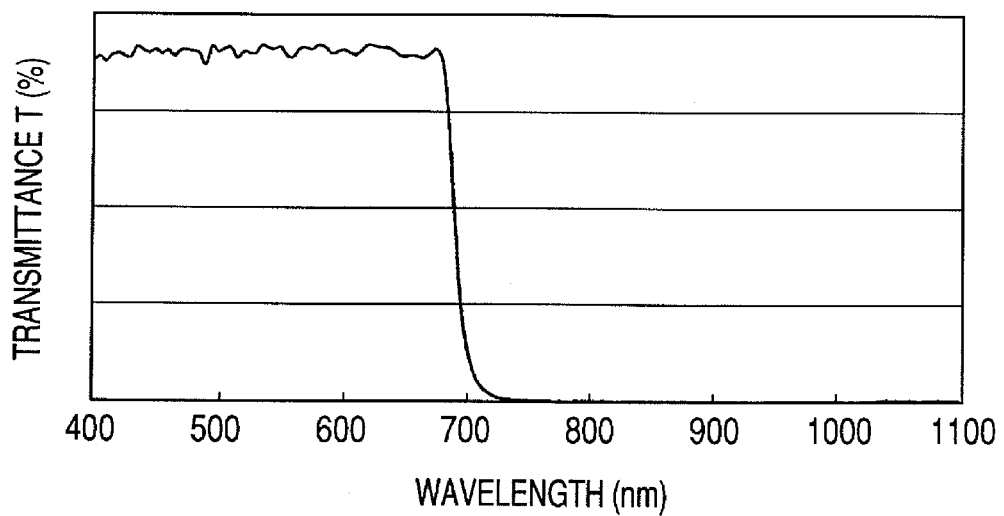
FIG. 16 shows the spectral characteristic of the infrared cut filter in the fifth embodiment.
Figure 17:
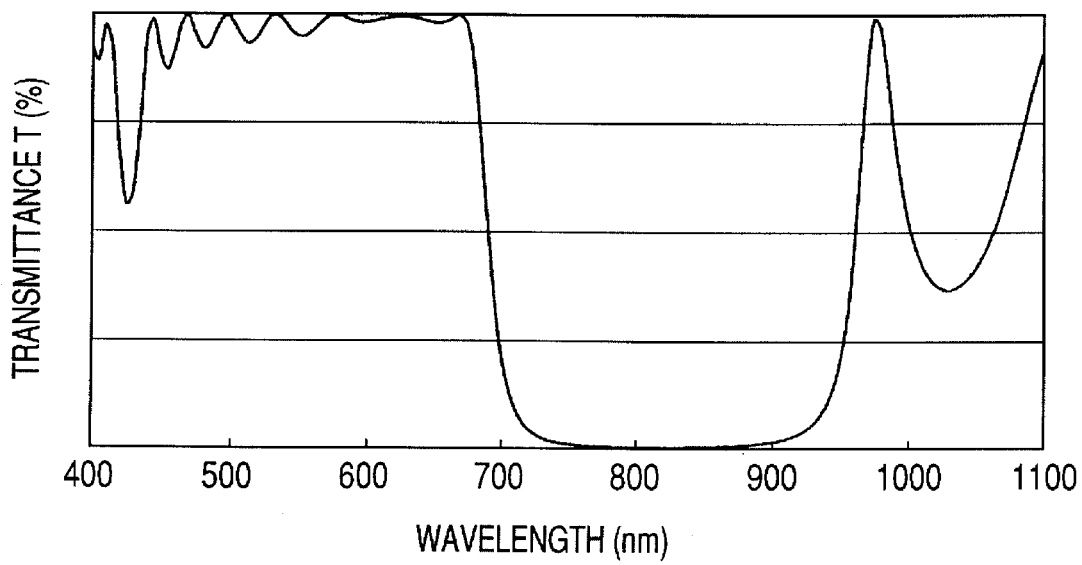
FIG. 17 shows the spectral characteristic of the red trim dichroic film in the fifth embodiment.

FIG. 13 is a circuit block diagram of a system, in which a separate lens apparatus 10 according to a fifth embodiment is mounted on a lens-interchangeable image pickup apparatus 50. The reference signs in FIG. 13 that are the same as those in FIG. 9 denote the elements having the same functions. The image pickup apparatus 50 is provided with an infrared cut filter 51 at the entrance (entrance side) of the light to be shot, and a red trim dichroic film 52 on the exit side of the prism 41R constituting the color separation optical system (that is, between the prism 41R and the prism 41G). FIG. 16 shows the spectral characteristic of the infrared cut filter 51. FIG. 17 shows the spectral characteristic of the red trim dichroic film 52.

Figure 14:
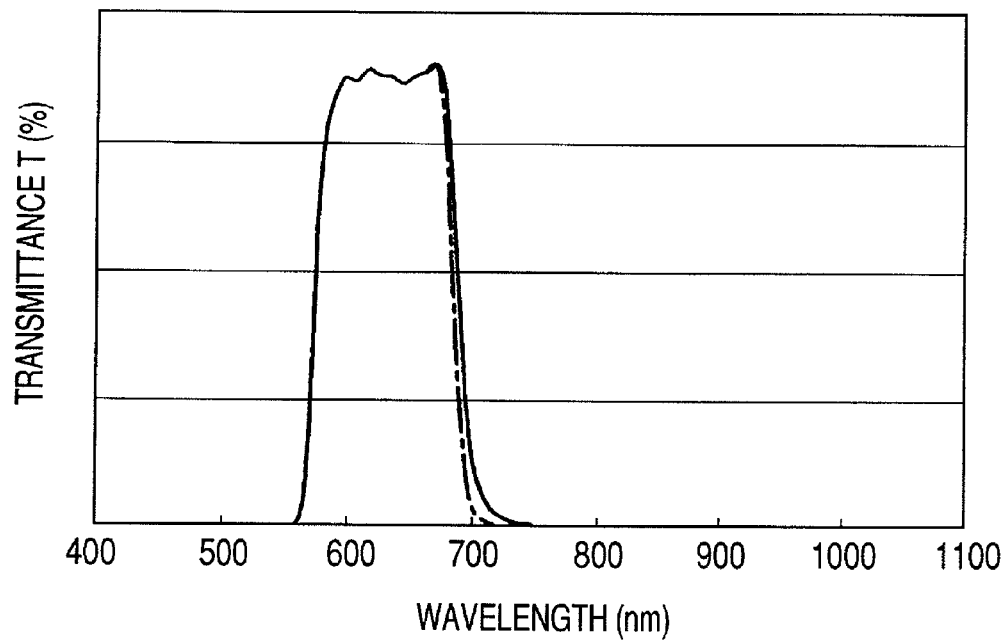
FIG. 14 shows the total transmittance characteristic in the R channel in the fifth embodiment

Suppose that the reflection element 15 in the lens apparatus 10 has the spectral characteristic shown in FIG. 11. In this case, the spectral characteristic in the shorter wavelength range of the total transmittance of the R channel (that is, the spectral characteristic of the whole optical system with respect to the red light traveling to the image pickup element 42R) is determined by the spectral reflectance characteristic of the red reflection dichroic film 43 provided in the image pickup apparatus 50, as is the case with the fourth embodiment. On the other hand, the spectral characteristic in the longer wavelength range is determined by the characteristic of the combination of the reflection element 15, infrared cut filter 51 and red trim dichroic film 52. The characteristic is shown in a dashed line in FIG. 14. FIG. 14 also shows a spectral characteristic (total transmittance of the light of R channel traveling to the image pickup element 42R for the R channel) with respect to the R channel which is appropriate to an image pickup apparatus as a solid line.

As can be understood in comparison of the solid line and the dashed line in FIG. 14, the transmittance in the longer wavelength range is different therebetween. Particularly, it is understood that the wavelength at which the transmittance is 50% is different therebetween. That is, the spectral characteristic of the transmittance in the R channel is deviated from the desired spectral characteristic shown in the solid line in FIG. 14. This is caused by the fact that both of the lens apparatus 10 and the image pickup apparatus 50 have optical elements that have the spectral characteristic near 700 nm shown in FIG. 11, so that the light in the wavelength range near 700 nm is trimmed double. As a result of such spectral characteristic, the transmittance in the wavelength range corresponding to the transition region between the transmission and the reflection (absorption) is made smaller than the desired transmittance.

Figure 15:
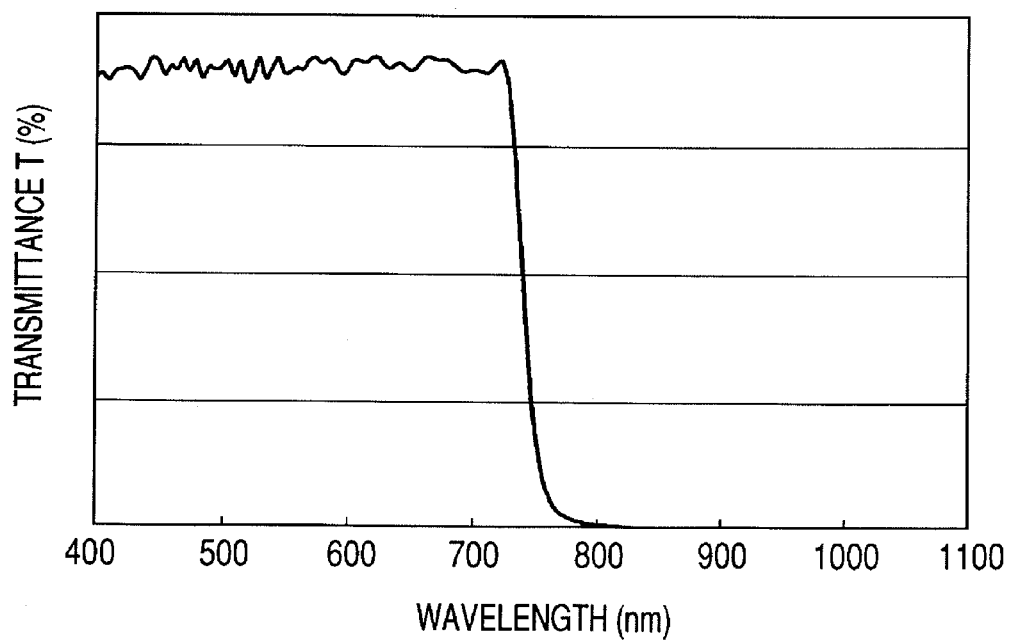
FIG. 15 shows the spectral transmittance characteristic of an infrared cut filter and a red trim dichroic film in the fifth embodiment.

In the fifth embodiment, the spectral characteristic of the reflection surface 15a of the reflection element 15 is configured different from that in the fourth embodiment. FIG. 15 shows the spectral characteristic of reflection surface 15a in the fifth embodiment. In comparison of the spectral characteristic of the fourth embodiment shown in FIG. 14 and the spectral characteristic of the fifth embodiment shown in FIG. 15, it can be understood that the wavelength region in which the transmittance falls (or the wavelength at which the transmittance is 50%) in the fifth embodiment is shifted toward the longer-wavelength side in comparison to the fourth embodiment. By configuring the reflection surface 15a to have such spectral characteristic, the wavelength of the long-wavelength side of the R channel (the wavelength range of the light incident on the image pickup element of the R channel) is determined by the red trim dichroic film 52 disposed on the image pickup apparatus 50, not by the reflection element 15. Since the wavelength of the long-wavelength side of the R channel is determined by only the red trim dichroic film 52, the reduction in the light amount in the wavelength range in the long-wavelength side of the R channel (the reduction in the light amount incident on the image pickup element for the R channel in the transition region) can be avoided. Accordingly, with such configuration, the lens apparatus or the lens-interchangeable image pickup apparatus which can be generally used can be realized, since useless light can be made use of in the focus detection system in a conventional image pickup apparatus while a portion of light is lost.

Sixth Embodiment

Figure 18:
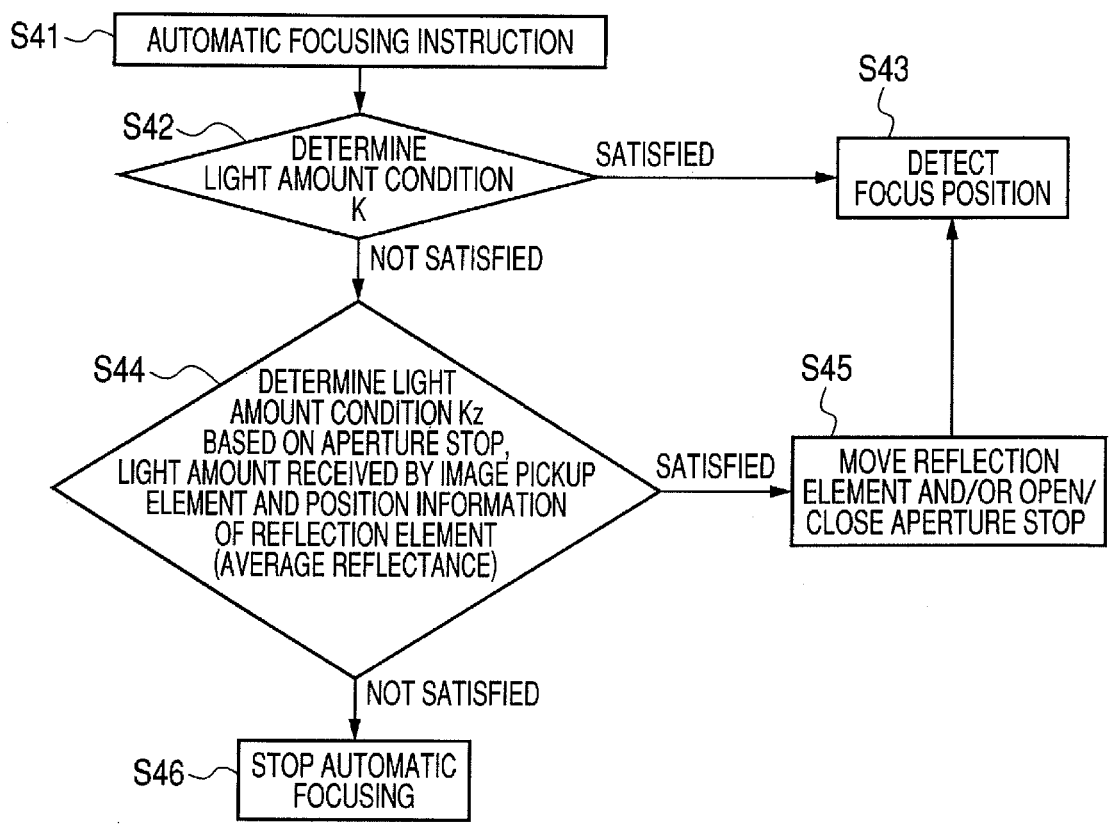
FIG. 18 shows the flow chart of an automatic focusing process according to the sixth embodiment.

FIG. 18 is a flow chart of an automatic focusing process according to a sixth embodiment.

First in step S41, an instruction for activating automatic focusing (AF) (automatic focusing instruction) is entered by a user (or a photographer).

Next in step S42, a determination associated with a light amount condition K that has been described in connection with some embodiments described above is made, namely, the amount of light of the light beams introduced to a focus detection image pickup element is detected and a determination is made as to whether or not automatic focusing can be performed. If the light amount condition K is satisfied, focus position detection is executed, namely, the focus position is detected, and then the focusing lens unit etc. is moved (step S43: execution of focus position detection).

In step S44, at least two (or, more preferably, all the) kinds of information among information on an aperture stop (information on its position, information on its aperture diameter and/or information on stop value etc), information on the amount of light that an image-taking image pickup element receives and information on the position of a reflection element (or information on the average reflectance of the portion of the reflection element that is inserted in the optical path of the image pickup element) are used. If it is determined based on the above information that the amount of light incident on the focus detection image pickup element is insufficient, the aperture may be increased or the average reflectance of the reflection element may be increased. On the other hand, if it is determined that the amount of light incident on the focus detection image pickup element is unduly large, the aperture may be reduced, or the average reflectance of the reflection element may be decreased. If an amount of light needed in the focus position detection can be made available by the above described operation, a "satisfied" determination is made, and movement of the reflection element and/or opening or closing of the aperture stop (or changing of the aperture value) is performed in step S45, and then a focus position detection step in step S43 is executed. On the other hand, if it is determined in step S44 that the needed light amount is not available, or a light amount condition Kz is "not satisfied", the automatic focusing is stopped (step S46).

Seventh Embodiment

Figure 19:
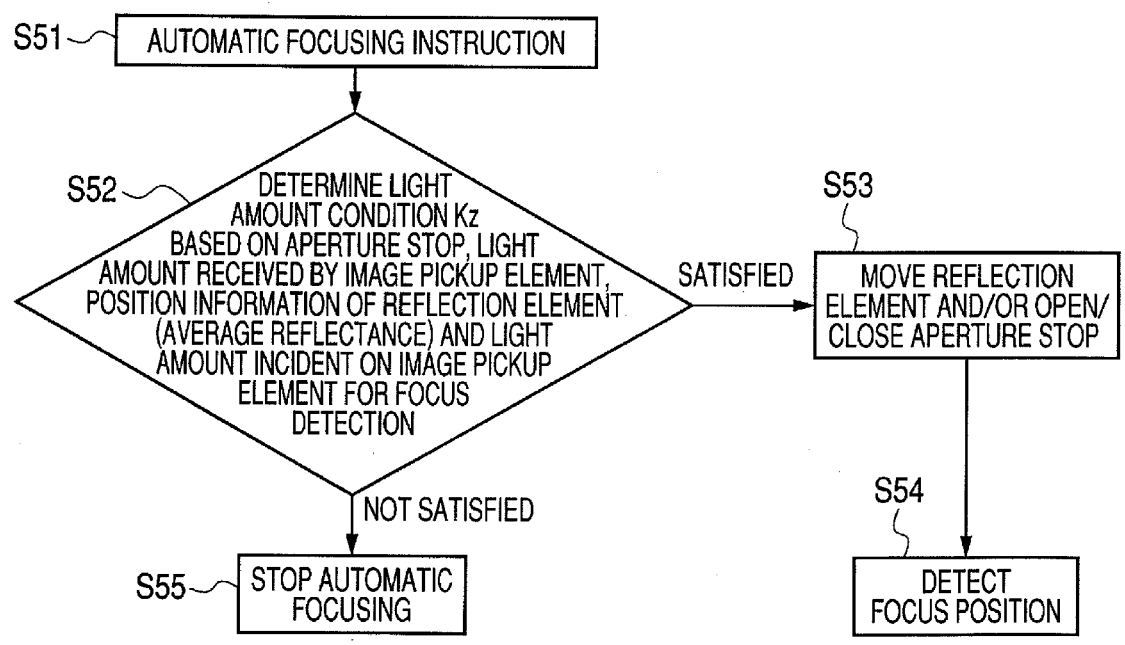
FIG. 19 shows the flow chart of an automatic focusing process in the seventh embodiment.

FIG. 19 is a flow chart of an automatic focusing process in a seventh embodiment.

First in step S51, an instruction for activating automatic focusing (AF) (automatic focusing instruction) is entered by a user (or a photographer).

Next in step S52, at least two (or, more preferably, all the) kinds of information among information on an aperture stop (information on its position, information on its aperture diameter and/or information on stop value, etc.), information on the amount of light that an image-taking image pickup element receives, information on the position of a reflection element (or information on the average reflectance of the portion of the reflection element that is inserted in the optical path of the image pickup element) and information on the amount of light incident on a focus detection image pickup element are used. If it is determined based on the above information that the amount of light incident on the focus detection image pickup element is insufficient, the aperture may be increased or the average reflectance of the reflection element may be increased. On the other hand, if it is determined that the amount of light incident on the focus detection image pickup element is unduly large, the aperture may be reduced, or the average reflectance of the reflection element may be decreased. If an amount of light needed in the focus position detection can be made available by the above described operation, a "satisfied" determination is made, and movement of the reflection element and/or opening or closing of the aperture stop (or changing of the aperture value) is performed in step S53, and then a focus position detection step in step S54 is executed. If it is determined in step S52 that the needed light amount is not available, or a light amount condition Kz is not satisfied (i.e., if a "not-satisfied" determination is made), the automatic focusing is stopped (step S55).

The values of the reflectance of the optical separating surface (or reflection surface) of the separating optical unit (or reflection element) are not limited to those of the embodiments shown in FIGS. 3 and 6. For example, the reflectance R in the right peripheral portion in FIG. 3 may be designed to be 0% and the reflectance R in the left peripheral portion may be designed to be 1%. Other like combinations of reflectances in the respective peripheral portions such as 0% and 5%, 0% and 10%, 1% and 5%, 1% and 10%, and 2% and 5% may also be adopted. This also applies to FIG. 6, as a matter of course.

In the above described first to seventh embodiments, it is desirable that the reflectance of the optical separating surface of the separating optical unit, or the transmittance of the reflection surface of the reflection element, that is, the ratio of the amount of light introduced to the focus detection image pickup element to the amount of light incident on the image pickup optical system, includes the range of 1% to 3% (more preferably, 0% to 5%). In particular, it is desirable that the optical separating surface (reflection surface) of the separating optical unit (reflection element) include a region in which the transmittance (reflectance) for light beams in the visible wavelength range (approximately from 400 nm to 700 nm) is equal to or less than 0.5% and a region in which the transmittance (reflectance) for light beams in the visible wavelength range is equal to or greater than 3%. In addition, it is desirable that the lens apparatus be designed in such a way that the average reflectance of the portion of the optical separating surface (reflection surface) of the separating optical unit (reflection element) that is inserted in the image pickup optical system can be made equal to or less than 0.5%.

The elements in the second to seventh embodiments are basically the same as the first embodiment unless otherwise specified. Features in the first to seventh embodiments may be adopted in possible combinations so long as they are compatible with each other.

The reflectance (or transmittance) of the optical separating surface (reflection surface) of the separating optical unit (reflection element) in the embodiments changes continuously in the z axis direction (or the first direction) as shown in FIGS. 3 and 6. In this specification, the "continuous change" in the reflectance should be interpreted to include even stepwise changes in the reflectance so long as every step in the stepwise changes in the reflectance is within 5% (more preferably, within 2%, still more preferably, within 1%).

Although the reflectance of the optical separating surface (reflection surface) changes continuously in the z axis direction, it is desirable that the reflectance be constant (with variations in the reflectance being within 2%, more preferably within 1%) in a direction perpendicular to the z axis (specifically, in a direction that forms an angle of 45 degrees relative to both the x axis and y axis). Further, the direction in which the separating optical unit moves in the seventh embodiment (first direction) can be a direction perpendicular to the optical axis. Furthermore, the reflectance of the optical separating surface in the separating optical unit in the seventh embodiment (ratio of light directed toward the image pickup element for focus detection) is desired to be less than 1% in an edge portion and not less than 5% (preferably not less than 10%) in the other edge portion.

Although in the embodiments the separating optical unit (reflection element) is disposed between the front relay lens unit 14 and the rear relay lens unit 16, the position of the separation unit is not limited to this. It may be disposed at any position on the image-taking image pickup element side of the focusing lens unit. Nonetheless, it is desirable that at least one lens (having a refractive power) be provided between the optical separating system and the image-taking image pickup element.

In the lens apparatus according to the embodiments, the separating optical unit is designed in such a way that the transmittance and the reflectance of the optical separating surface (reflection surface) of the separating optical unit (reflection element) changes continuously, so that satisfactory automatic focusing can be achieved according to shooting situations. In particular, the amount of light introduced to the focus detection image pickup element can be changed even during shooting, since the image is not interrupted during changing the amount of light introduced to the focus detection image pickup element, namely during changing the transmittance and reflectance of the separating optical unit (reflection element).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-039533, filed Feb. 20, 2007, which is hereby incorporated by reference herein in its entirety.

What is claimed is:

1. A lens apparatus comprising:
   a focusing lens unit;
   a separating optical unit disposed on an optical axis of the lens apparatus, wherein the separating optical unit includes an optical separating surface which is disposed along a tilted plane with respect to an optical axis of the focusing lens unit;
   a focus detection unit that detects a focus condition using a light beam from the separating optical unit;
   a first drive unit that drives the focusing lens unit based on an output of the focus detection unit; and
   a second drive unit that drives the separating optical unit, wherein reflectance of the optical separating surface changes along a first direction in the tilted plane, and wherein the second drive unit drives the separating optical unit in the first direction.

2. An apparatus according to claim 1, wherein the second drive unit drives the separating optical unit based on an amount of light incident on the focus detection unit.

3. An apparatus according to claim 1, wherein the reflectance of the optical separating surface monotonously decreases from one end to the other end in the first direction.

4. An apparatus according to claim 1, wherein the first direction is a direction perpendicular to a plane defined by the optical axis and a normal of the optical separating surface.

5. An apparatus according to claim 1, wherein the lens apparatus can be attached to/detached from an image pickup apparatus having an image pickup element.

6. An apparatus according to claim 1, wherein the lens apparatus can be attached to/detached from an image pickup apparatus having an image pickup element, and the second drive unit drives the separating optical unit based on an amount of light incident on the image pickup element.

7. An apparatus according to claim 1, wherein the first direction is perpendicular to the optical axis.

8. A lens apparatus according to claim 1, wherein the first direction is parallel to the tilted plane and is perpendicular to the optical axis.

9. An image pickup apparatus comprising:
an image pickup element; and
a lens apparatus that introduces light from an object to the image pickup element,
wherein the lens apparatus includes:
(a) a focusing lens unit;
(b) a separating optical unit disposed on an optical axis of the lens apparatus, wherein the separating optical unit includes an optical separating surface which is disposed along a tilted plane with respect to an optical axis of the focusing lens unit;
(c) a focus detection unit that detects a focus condition using a light beam from the separating optical unit;
(d) a first drive unit that drives the focusing lens unit based on an output of the focus detection unit; and
(e) a second drive unit that drives the separating optical unit,
wherein reflectance of the optical separating surface changes along a first direction in the tilted plane, and
wherein the second drive unit drives the separating optical unit in the first direction.

10. An image pickup apparatus according to claim 9, wherein the second drive unit drives the separating optical unit based on an amount of light incident on the image pickup element.

* * * * *